No. 627,018. Patented June 13, 1899.
F. A. STEVENS.
METHOD OF MANUFACTURING SPECTACLE FRAMES.
(Application filed Apr. 17, 1899.)
(No Model.)
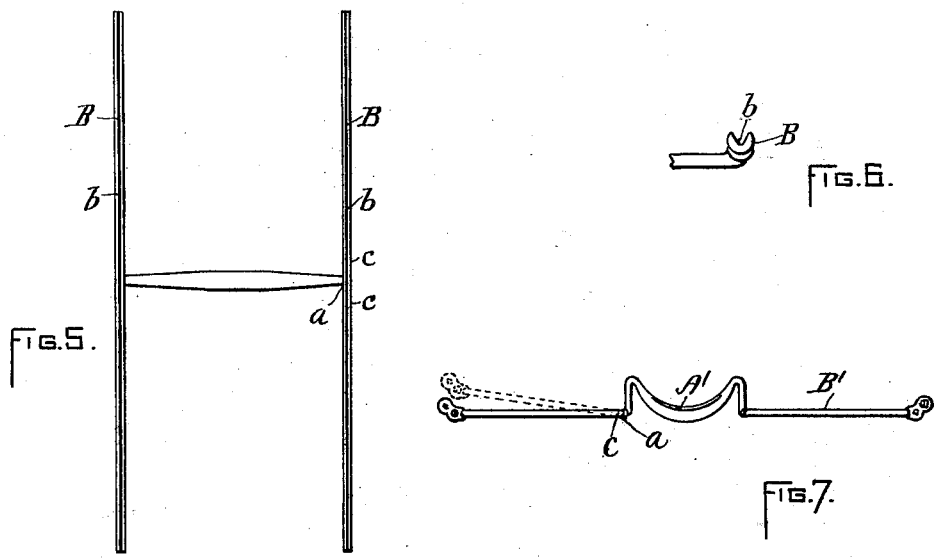
WITNESSES:
INVENTOR:
Frederick A. Stevens
BY S. Scholfield.
ATTY.

UNITED STATES PATENT OFFICE.

FREDERICK A. STEVENS, OF PROVIDENCE, RHODE ISLAND.

METHOD OF MANUFACTURING SPECTACLE-FRAMES.

SPECIFICATION forming part of Letters Patent No. 627,018, dated June 13, 1899.

Application filed April 17, 1899. Serial No. 713,387. (No model.)

*To all whom it may concern:*

Be it known that I, FREDERICK A. STEVENS, a citizen of the United States, residing at Providence, in the State of Rhode Island, have invented a new and useful Improvement in Methods of Manufacturing Spectacle-Frames, of which the following is a specification.

The object of my invention is to produce a spectacle-frame in which the front is provided with a great degree of stiffness and elasticity; and it consists in imparting the required degree of elasticity to the eyes of the front by swaging or rolling the groove in the eye-wire subsequent to the soldering of the eye-wire to the nose-piece, whereby the eye-wire will be strengthened and prevented from being bent near its soldered connection with the nose-piece. The eye-wires have heretofore been grooved prior to their attachment to the nose-piece by soldering, which leaves the metal of the completed eye in such a softened condition that it is extremely liable to bending, especially in gold-filled spectacle-frames.

In the accompanying drawings, Figure 1 represents the face view of a nose-piece in its longitudinally-outspread condition. Fig. 2 represents an edge view of the same. Fig. 3 represents a side and end view of a suitable piece of wire adapted to form an eye-wire of the spectacle-frame. Fig. 4 represents an end view of the wires soldered to the ears of the nose-piece. Fig. 5 represents the wires as grooved longitudinally to produce the required stiffness and elasticity at the soldered connection and to hold the edge of the lens. Fig. 6 represents an enlarged end view of one of the wires, showing the approved form of the groove. Fig. 7 represents an edge view of the completely-formed eyes of the face. Fig. 8 represents the front view of the same.

In the drawings, A represents a longitudinally-outspread nose-piece, and B B, Fig. 4, pieces of wire, such as shown in side and end view in Fig. 3, of about the proper length to form the completed eye of the frame, the said wires being soldered to the ears *a a* of the nose-piece, and by reason of soldering the wires to the nose-piece prior to the formation of the longitudinal groove *b* in the wire I am enabled to produce gold-filled frames having the eye-wires of desirable stiffness and elasticity, the formation of the groove *b* by rolling or swaging serving to impart the proper degree of stiffness and elasticity to the portion *c c* of the eye B' at each side of its soldered connection with the ear *a* of the nose-piece. The eye-wires B B of a spectacle-frame are ordinarily made very light, so that the comparative rigidity of the nose-piece A' causes the eye B' to yield to the bending stress, so as to become deflected from its proper plane, as shown in dotted line in Fig. 7; but by my improvement I am able to so change the arrangement of the metallic molecules in both the eye-wires and the soldered joint subsequent to the soldering operation that the softened wire will be hardened and a greatly-improved spectacle-frame produced. After the wires B B have been grooved they are to be trimmed to the proper length and the end pieces attached thereto, as usual in the manufacture of the eyes of spectacle-frames.

I claim as my invention—

The method herein described, for the manufacture of spectacle-frames, which consists in first soldering the eye-wires and nose-piece together, then swaging or rolling the longitudinal groove for the edge of the lens in the softened eye-wires, and thus hardening the said wires at their soldered connection with the nose-piece, to prevent bending at the soldered connection, as set forth.

FREDERICK A. STEVENS.

Witnesses:
SOCRATES SCHOLFIELD,
ALBERT E. LENZ.